Oct. 5, 1971 W. WEGLIN 3,609,868

MEASURING DEVICE AND TECHNIQUE

Original Filed Dec. 15, 1967

INVENTOR.
WALTER WEGLIN
BY
Christensen, Sanborn and Matthews
ATTORNEYS 3,609,868
MEASURING DEVICE AND TECHNIQUE
Walter Weglin, 10758 22nd Ave. SW.,
Seattle, Wash. 98146
Continuation of application Ser. No. 691,017, Dec. 15,
1967. This application Nov. 10, 1969, Ser. No. 871,640
Int. Cl. G01b 5/00
U.S. Cl. 33—125                                    10 Claims

ABSTRACT OF THE DISCLOSURE

A measuring device and technique are disclosed whereby dimensions in a small order of magnitude, such as hundredths and thousandths of an inch, can be laid off from a scale, without assistance to the eye and without straining the eye in the process. A scale is used which has a series of intervals graduated to the next higher order of magnitude, say tenths, and a so-called adaptor is applied to the scale at a common point adjacent each interval to be subdivided into a fraction thereof. The adaptor has a locater thereon which registers with the site of the fraction when the body of the adaptor is disposed at a predetermined angle about the point of its application to the scale. To change to another fraction, the adaptor is maintained at the point of application while the body of the same is shifted in relation to the scale until the position of the locater registers with the site of the new fraction desired, there being intelligence on the adaptor to indicate the fraction corresponding to each position of the locater.

Figure 1:
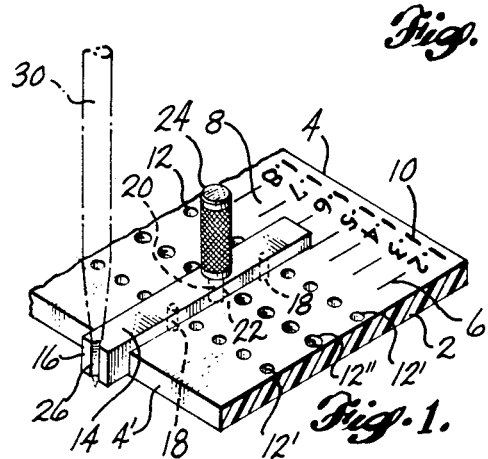

This application is a continuation of my copending application Ser. No. 691,017, filed Dec. 15, 1967, now abandoned.

FIELD OF THE INVENTION

This invention relates to devices and techniques for laying off dimensions, degrees, and the like; and in particular to devices and techniques of this nature which are adapted for laying off minutely incremental measurements, such as hundredths and thousandths of an inch.

BACKGROUND OF THE INVENTION INCLUDING CERTAIN OBJECTS THEREOF

The most common instrument for this purpose is the scale; that is, a strip of wood, metal, plastic or the like, which has a series of graduated spaces or intervals extending along one face thereof, and usually in a course contiguous to one edge of the strip so that the measurement can be laid off along the edge. The intervals are generally graduated in two orders of magnitude, and the higher order is generally represented by larger markings than the lower. Of necessity, the markings for the lower order are also more closely spaced, and therefore, generally less discernible to the eye and less easily distinguished from one another. This is particularly true when the scale is graduated to an order of hundredths or less. Because of the small increment of change, it is an exceedingly difficult task for the human eye to pick out a fraction and to mark or fix its position apart from the sites or positions of the other nearby fractions. When required to make and mark several selections over a short period of time, the eye quickly fatigues and becomes confused by the maze of information before it. Of course, there are devices such as magnifying glasses, by which the eye can gain optical assistance. However, they are not a true solution to the problem since the task remains for the eye itself to pick up and distinguish one fraction from another.

One object of the present invention is to provide a measuring device and technique wherein the markings and numerical intelligence identifying the lower order or orders of magnitude on such a scale, are more readily discernible and distinguishable from one another. Another object is to provide a device and technique of this nature wherein the markings and intelligence used to identify the lower order or orders, are widely spaced from the markings and intelligence for the higher or highest order. A still further object is to provide such a device and technique wherein the markings and intelligence for the lower order or orders is carried on a separate component from that carrying the higher or highest order, and this separate component is applied to the scale so as to present the markings and intelligence thereon in a greatly enlarged and more widely dispersed form. Still another object is to provide a device and technique of this nature wherein the separate component may project beyond the edge of the scale to allow for the use of a scribe in marking the sites of the fractions selected. Additional objects include the provision of a device and technique of this nature wherein this separate component can be interlocked with the scale when the position of a fraction is determined; and if desired, the position of the fraction can be automatically determined at the time when the component is applied to the scale. Still other objects will be apparent from the description of the invention which follows hereafter.

SUMMARY OF THE INVENTION

These objects and advantages are realized by a measuring device and technique of my invention wherein to lay off measurements of a small order of magnitude, a scale is used which has a series of intervals graduated to the next higher order of magnitude, and a so-called adaptor is applied to the scale at a common point adjacent each interval to be subdivided into fractions thereof. The adaptor has a locater thereon which registers with the site of a fraction when the body of the adaptor is disposed at a predetermined angle about the point of its application to the scale. To change to another fraction, the adaptor is maintained at the point of application while the body of the same is shifted in relation to the scale until the locater registers with the site of the new fraction desired, there being intelligence on the adaptor to indicate the fraction corresponding to each position of the locater.

There are two ways in which the locater may be brought into registry with the site of a fraction in the first stage of the operation. Under one mode of operation, the adaptor has an elongated form and the locator is brought into registry with the site of the fraction by positioning the body of the adaptor over the interval to be subdivided so that the longitudinal axis of the same is disposed on a perpendicular to the line of graduations on the scale. Under the other mode of operation, the adaptor has a marking on one edge thereof, and the locater is brought into registry with the site of the fraction by positioning the body of the adaptor over the interval to be subdivided so that the marking intersects one of the graduations on the scale.

There are also two ways of changing fractions. Under the first mode of operation above, the adaptor comprises a plurality of similar such bodies having locaters at relatively transversely offset positions thereon, corresponding to the sites of the fractions, and the user changes fractions by interchanging one body for another until the position of the locater corresponds to the new fraction desired. Under the other mode of operation, the adaptor has a plurality of similar such markings on the edge thereof, at relatively angularly offset positions about the point of application to the scale, corresponding to the sites of the fractions, and the user changes fractions by rotating the adaptor about the point of application until the one graduation on the scale is intersected by the marking corresponding to the new fraction desired.

In both cases, the graduations on the scale may be spaced well back from the edge of the scale along which the measurement is laid off, so that the adaptor can be interposed in plain view of the eye, at a point between the edge and the line of graduations. Also, the locater may be indented into a portion of the adaptor which projects beyond the edge of the scale so that the locater can accommodate a scribe for marking the site of a fraction.

In preferred embodiments of the invention, the adaptor is usually interlocked against rotation on the scale when the locater is positioned at the side of the fraction desired. In fact, under my first mode of operation, the adaptor bodies are preferably interlocked with the scale at the time each body is applied to the scale, so as to make the positioning or "reading" process automatic.

If desired, the adaptor may also be interlocked against detachment from the scale, if it is to remain on the scale for a prolonged period of time.

In most instances, these preferred embodiments employ a scale and adaptor which make a pin and hole connection at the point of application. They also employ a second pin and hole connection as the means for interlocking the adaptor against rotation; the hole being in the form of an arcuate slot in the case of my second mode of operation, and there being means such as a shoulder screw or magnet on the pin for clamping the adaptor to the scale at the desired angular orientation in the slot. If desired, similar means may be used to clamp the adaptor to the scale under the first mode of operation as well.

The locater may comprise a single mark such as a line, hole, or notch on the adaptor. Or it may comprise a plurality of the same, one of which serves to register with the site of the fraction selected, and the remainder of which serve to locate the site or sites of fractions in the next lower order of magnitude below the fraction selected, as for example, where the one mark registers with the site of a hundredth fraction, and the remainder locate the sites of the individual thousandths making up the hundredth fraction.

The locater may also include an additional adaptor which is carried in "piggy-back" fashion on the first adaptor to locate the site or sites of fractions in the next lower order of magnitude below the fraction selected on the first adaptor.

DESCRIPTION OF THE PREFERRED EMBODIMENTS

Figure 2:
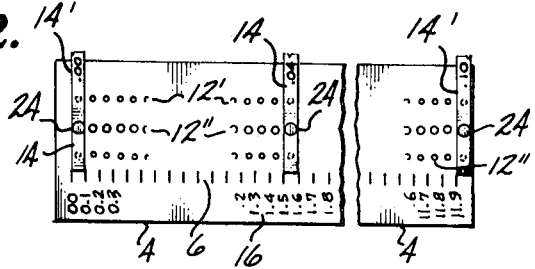
Figure 3:
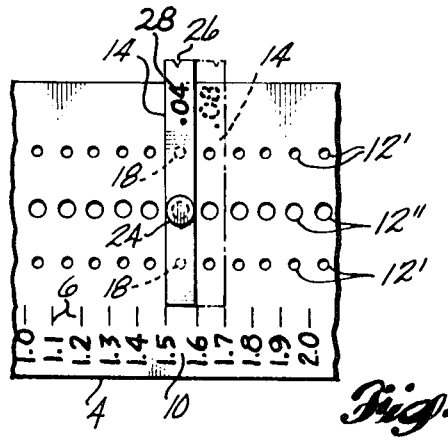
Figure 4:
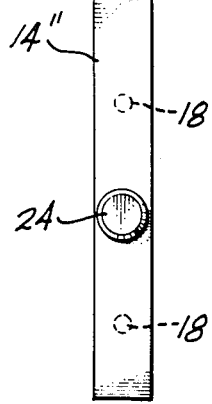
Figure 5:
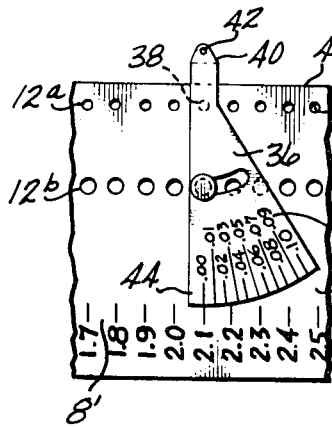
Figure 6:
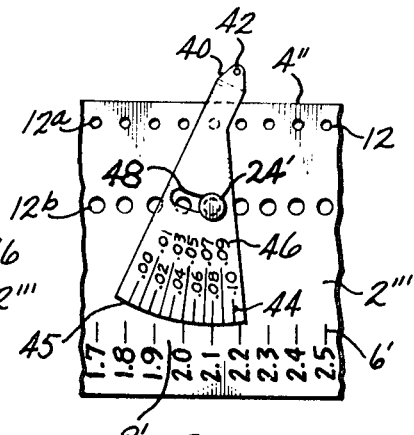

Two of the preferred embodiments are illustrated in the accompanying drawing wherein:

FIG. 1 is a part-perspective view of one embodiment;
FIG. 2 is a part plan view of the same;
FIG. 3 is a closer plan view of the scale and adaptor at the center of the device in FIG. 2;
FIG. 4 is a plan view of a modified form of adaptor;
FIG. 5 is a part plan view of the other embodiment in one stage of its use or operation; and
FIG. 6 is a part plan view of this other embodiment in a later stage of its use or operation.

In both embodiments the scale is comprised of a flat elongated rod 2 having straight parallel edges 4 running longitudinally thereof. On the upper face of the rod, there is a series of graduated intervals 8 extending on a line closely parallel to one edge. The graduations 6 represent progressively larger longitudinal segments of the rod, in this case in the order of tenths of an inch. Numerical intelligence 10 are inscribed next to the graduations to rapidly communicate the order of magnitude to the user. However, as shall be explained, the graduations and numerals are read with respect to the lower edge 4' of the rod in FIG. 1, which shall be referred to hereafter as the reading edge of the scale.

The face of the rod also has holes 12 therein, in spaced parallel courses running lengthwise of the rod, on lines parallel to and between the line of intervals 8 and the reading edge of the scale. In the embodiment of FIGS. 1–3, the holes are disposed at points midway between the lines projected by the graduations 6, that is, midway of the intervals 8. In the embodiment of FIGS. 5 and 6, the holes are disposed on the lines projected by the graduations 6'. Also in the case of the first-mentioned embodiment there are three holes for each interval; whereas, in the case of the other embodiment there are only two holes per graduation.

The holes provide means for keying the adaptor to the scale at a fixed orientation with respect to the line of intervals and the reading edge of the scale. In the embodiment of FIGS. 1–3 the body of the adaptor has a lightweight strip-like tail portion 14 of wood, metal, plastic or the like which is sized to correspond wtih the width of an interval on the scale. The adaptor has a flange or lug 16 thereon which depends from one end thereof, and a pair of stud pins 18 which depend from the underside thereof. The pins are spaced from the lug and sized to engage in the relatively endmost holes 12' of an interval when the lug is abutted against the reading edge 4' of the scale, as in FIG. 1. In addition, the adaptor has a bore 20 therethrough which is disposed at an intermediate point thereon to register with the intermediate hole 12" of the interval. The bore carries a threaded shoulder screw 22 with a knurled head 24 for turning it by hand, and the intermediate hole 12" is complementally threaded to allow the screw to be engaged therein for purposes of detachably interlocking the adaptor with the scale.

The adaptor also has a vertical notch 26 in the outside obverse or face of the lug. The notch is disposed on the lug at the site of a specified fraction of the interval to which the adaptor is applied. Due to the identity of location among the holes 12 from one interval to the next, the notch also registers with the same fraction at any other interval, and thus may be used to subdivide any one of the intervals. Numerical intelligence 28 inscribed on the upper face of the adaptor, indicates the magnitude of the fraction, in this case in the order of hundredths of an inch. Also, the notch is adapted to accommodate a pencil or other scribe 30 for purposes of marking the site of the fraction.

In use the adaptor is but one of a plurality of similar such strips having notches at varying transverse positions thereon corresponding to the sites of the frictions into which it may be desirable to subdivide the interval, including the zero site of the next lowest unit mark 6. Therefore, to change fractions the user lifts the strip then on the scale and replaces it with the strip bearing the desired new fraction. Each strip automatically assumes its reading position on the scale by virtue of the keyed relationship between the pins 18 on the strips and the holes 12 in the scale. Each also places the notch 26 and the intelligence 28 therewith at a position well above the intelligence 10 on the scale so that the eye can easily "single out" the notch and guide the scribe into it.

If desired, several strips can be set up on the scale at one time, as in FIG. 2, and in addition, each can be firmly secured to the scale by clamping it to the scale with the shoulder screw 22 thereon.

In FIG. 4, a modified form of adaptor 14" is shown which also enables the user to determine the sites of the fractions in the next order of magnitude below that of the notches, in this case, thousandths of an inch. The thousandths positions are represented by a series of holes 32 in the lug of the adaptor, together with identifying numerical intelligence 34. The adaptor strip is applied to the scale in the same manner as in FIGS. 1–3, and as before, the number of strips corresponds to the number of fractions into which an interval may be subdivided.

The embodiment illustrated in FIGS. 5 and 6 employs a fan-shaped adaptor 36 which has a stud pin 38 depending from the apex thereof. The stud pin is sized to rotatably engage in any one of the holes 12a disposed adjacent the reading edge 4″ of the scale 2‴. In addition, the adaptor has a blunt-nosed pointer 40 on the apex thereof which projects outwardly beyond the edge of the scale, along the line of projection of one radial edge of the adaptor. The pointer has a vertical hole 42 in the nose portion thereof which is aligned, first with the pin, and then with the first of a series of graduations 44 inscribed at equiangularly offset radii about the center of the pin. The graduations extend to the arcuate edge of the adaptor, and each is accompanied by numerical intelligence 46 which identifies the fractional position of the hole 42 in the interval to the right of the scale graduation 6′ on which the adaptor is applied, when the adaptor graduation 44 intersects the latter scale graduation. Since the hole 12a and the pin 38 are coincident with the line of projection of the latter scale graduation 6′ the first graduation 44 on the adaptor also coincides with this line and the hole 42 has a zero deflection from the same which is reflected in the intelligence 46 accompanying the adaptor graduation. See FIG. 5. However, when the point 40 is swung to the right, the hole 42 crosses the sites of the various fractions in the intervals and each can be located by positioning the adaptor graduation 44 corresponding thereto on the left hand scale graduation 6′. See FIG. 6. To fix the hole at a site, the adaptor has an arcuate slot 48 therein which carries a shoulder screw 24′ in the same manner as the hole 20 in the embodiment of FIGS. 1–3. The relatively inside hole 12b in the scale is threaded to receive the screw and once a fraction is determined, the screw is tightened down against the adaptor to clamp it in position on the scale.

While the invention has been described with reference only to the presently preferred embodiments above, and modifications thereof, it will be understood that many other additions and changes can be made in and to the invention without departing from the scope and spirit of the same as defined in the claims following.

What is claimed is:

1. In a device for laying off measurements, a scale having a flat face along one edge thereof, and a flat surface on one side thereof which coterminates with the face of the edge at an angle thereto, means defining a series of equally spaced graduation marks on the scale disposed on perpendiculars to the edge adjacent the surface on the one side thereof, in a course spaced inwardly from the edge adjacent the surface, means defining a plurality of first identical deformations on the scale, disposed at identical locations in the intervals between perpendiculars, inwardly from the edge of the scale adjacent the surface on the one side thereof; and an adaptor body disposed on the scale in a selected one of the intervals, and detachably engaged with the scale in the respective interval, said body having a lug portion thereof contiguous to the face of the edge in the respective interval, a tail portion thereof opposite the surface on the one side of the scale, between the edge and the course of the graduation marks in the respective interval, and scribe-engageable detent means on the lug portion adapted to register the scribe with a point on a surface extending thereopposite on the other side of the scale, and said body being one of a set of similar such bodies which register with the scale in similar fashion and have second identical deformations at identical locations on the tail portions thereof which mate with any of the first identical deformations on the scale, to index the bodies to the scale in a common orientation and disposition from one interval to another, but which have the detent means at different transverse locations on the lug portions thereof corresponding to the different fractions of the intervals, so that the scribe can be registered with points on the surface thereopposite, corresponding to the fractions, by interchanging the bodies for one another in the respective intervals.

2. The device according to claim 1 wherein the bodies have indicia of intelligence thereon indicating the fractions corresponding thereto.

3. The device according to claim 1 wherein the detent means take the form of indentations in the lug portions.

4. The device according to claim 3 wherein the indentations take the form of notches in the obverse faces of the lug portions opposite the edge.

5. The device according to claim 1 wherein the deformations take the form of complemental pins and holes on the scale and the tail portions of the bodies.

6. The device according to claim 1 wherein the bodies have L-shaped configurations, the relatively shorter and longer right-angularly related sections of which are defined by the lug portions and tail portions of the bodies, respectively.

7. The device according to claim 1 wherein the graduation marks are disposed on the surface on the one side of the scale, in the plane thereof.

8. The device according to claim 1 wherein the edge of the scale is rectilinear.

9. The device according to claim 1 further comprising means for detachably interlocking the bodies with the scale when the bodies are registered and indexed thereon.

10. The device according to claim 1 further comprising scribe engageable detent means on the lug portions of the bodies adapted to register the scribe with points on the surface thereopposite, corresponding to fractions in a lower order of magnitude than that of the first mentioned fractions.

References Cited

UNITED STATES PATENTS

| | | |
|---|---|---|
| 101,689 | 4/1870 | Whitmore. |
| 721,800 | 3/1903 | Heatly _____ 33—169 A |
| 948,059 | 2/1910 | Larson et al. _____ 33—111 X |
| 1,311,602 | 7/1919 | Harter _____ 33—173 |
| 1,465,106 | 8/1923 | White _____ 33—173 |
| 1,526,305 | 2/1925 | Neumaier. |
| 2,112,179 | 3/1938 | Sharrar _____ 33—189 X |
| 2,112,768 | 3/1938 | Fox _____ 33—169 A X |
| 2,241,692 | 5/1941 | Williams. |
| 2,665,488 | 1/1954 | Tobey _____ 33—189 X |
| 2,741,848 | 4/1956 | Livingston. |
| 2,768,443 | 10/1956 | Chiaravalloti _____ 33—27 C |
| 2,853,570 | 9/1958 | Garno _____ 33—168 A X |
| 3,224,103 | 12/1965 | Kiralfy _____ 33—169 A X |

FOREIGN PATENTS

| | | |
|---|---|---|
| 901,298 | 10/1944 | France _____ 33—168 A |
| 322,662 | 8/1957 | Switzerland _____ 33—125 |

LEONARD FORMAN, Primary Examiner

U.S. Cl. X.R.

33—189